United States Patent
Hasel et al.

(10) Patent No.: US 11,236,842 B2
(45) Date of Patent: Feb. 1, 2022

(54) MIXING VALVE

(71) Applicant: SVM Schultz Verwaltungs-GmbH & Co. KG, Memmingen (DE)

(72) Inventors: Claus Peter Hasel, Memmingen (DE); Verena Jöchle, Buchenberg (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 0 days.

(21) Appl. No.: 16/845,336

(22) Filed: Apr. 10, 2020

(65) Prior Publication Data

US 2020/0326015 A1     Oct. 15, 2020

(30) Foreign Application Priority Data

Apr. 12, 2019   (DE) .......................... 102019109835.1
Aug. 14, 2019   (DE) .......................... 102019121944.2

(51) Int. Cl.
   *F16K 31/56*   (2006.01)
   *F16K 11/078*  (2006.01)
   *E03C 1/10*    (2006.01)

(52) U.S. Cl.
   CPC .......... *F16K 31/566* (2013.01); *F16K 11/078* (2013.01); *E03C 1/10* (2013.01)

(58) Field of Classification Search
   CPC ................. F16K 11/078; F16K 31/566; Y10T 137/86493
   See application file for complete search history.

(56) References Cited

U.S. PATENT DOCUMENTS

| | | | | |
|---|---|---|---|---|
| 2,823,697 A * | 2/1958 | Picard | ................... | F16K 11/078 137/597 |
| 3,204,921 A * | 9/1965 | Ages | ..................... | F16K 31/566 251/75 |
| 3,596,872 A * | 8/1971 | Greenamyer | .......... | G05D 23/10 251/77 |
| 3,828,821 A * | 8/1974 | Dotter | ..................... | F16K 11/18 137/636.4 |
| 3,845,991 A | 11/1974 | Engle | | |
| 4,574,006 A * | 3/1986 | Cheung | ................ | F25J 3/04412 62/648 |
| 5,918,630 A | 7/1999 | Lucas et al. | | |

(Continued)

FOREIGN PATENT DOCUMENTS

DE      2441714 A1    7/1975
DE     19747307 A1    6/1998

(Continued)

OTHER PUBLICATIONS

European Office Action for European Application No. 20165420.9 dated Oct. 4, 2021 (5 pages).

*Primary Examiner* — Kevin R Barss
(74) *Attorney, Agent, or Firm* — Reising Ethington, P.C.

(57) ABSTRACT

Proposed is a mixing valve, including a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force in opposition to the resetting force of at least one spring.

19 Claims, 7 Drawing Sheets

(56) References Cited

U.S. PATENT DOCUMENTS

| | | | |
|---|---|---|---|
| 6,299,130 B1 * | 10/2001 | Yew | F16K 31/06 |
| | | | 251/129.15 |
| 6,311,948 B1 * | 11/2001 | Weaver | F16K 31/566 |
| | | | 137/454.6 |
| 7,497,232 B2 | 3/2009 | Muller et al. | |
| 7,886,760 B2 | 2/2011 | Groschel et al. | |
| 8,397,759 B2 | 3/2013 | Oikawa et al. | |
| 9,206,921 B1 | 12/2015 | Jansen et al. | |
| 2018/0284818 A1 | 10/2018 | Christenson | |
| 2019/0085989 A1 * | 3/2019 | Klein | F16K 31/52483 |

FOREIGN PATENT DOCUMENTS

| | | | | |
|---|---|---|---|---|
| DE | 69804426 T2 | 11/2002 | | |
| DE | 102004020268 A1 | 11/2005 | | |
| DE | 102005056029 A1 | 6/2006 | | |
| DE | 102016224323 A1 | 6/2018 | | |
| EP | 1910724 A1 | 4/2008 | | |
| EP | 3748209 A1 * | 12/2020 | | B64F 1/28 |

* cited by examiner

MIXING VALVE

CROSS-REFERENCE TO RELATED APPLICATION

This application claims the benefit of German Patent Application No. 10 2019 109 835.1, filed Apr. 12, 2019, and German Patent Application No. 10 2019 121 944.2, filed Aug. 14, 2019.

INTRODUCTION

The disclosure relates to a mixing valve.

The prior art disclosed in this regard is very complicated in design and, in addition, has a tendency to malfunction or fail totally if there is inner contamination caused by dirt. In particular, water taps which drip as a result of the mixing valve malfunctioning due to contamination or water taps which can no longer be closed on account of the mixing valve failing totally can regularly lead to annoyance on the part of the user. A water tap can no longer be closed if the fluid flow can no longer be interrupted as usual. This is not restricted to just water-conducting devices but also relates to many fluid-conducting devices.

Inner contamination can occur, for example, as a result of the fluid flow guided through the mixing valve entraining contaminants and carrying them into the mixing valve. Contamination may well be, for example, a hair or a grain of sand. The contamination can be deposited in the interior of the mixing valve and/or jam moving elements and/or obstruct sealing surfaces, which can then result in the mixing valve no longer being able to close as desired and the fluid flow no longer being able to be interrupted. If the fluid flow is reduced, the tap can then drip (malfunction) and if the reduction in the fluid flow is prevented, the fluid can continue to flow unreduced from the tap (total failure).

SUMMARY

One object of the disclosure, consequently, is to improve the prior art in particular with regard to the problems named in the introduction.

Proposed in this connection, according to an embodiment, is a mixing valve, including a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force in opposition to the resetting force of at least one spring.

It is one advantage, in an embodiment, that the valve body simultaneously comprises both a valve body part facing the switching valve part and a valve body part facing the proportional valve part. The external force can be applied by an electromagnetically actuatable plunger.

The control of the mixing valve, in this embodiment, is so cleverly designed that in a first position the switching valve is at least open but no regulating function of the proportional valve part takes place yet and is not affected until a second phase. In other words, therefore, the mixing valve according to the embodiment is able to permit an at least two-phase operation with its valve body. It is, consequently, possible to release a first fluid flow in a first phase, whilst, preferably without mixing, a second fluid flow is still closed. Said second fluid flow can then be additionally connected in the second phase. In addition, a second fluid flow from the second phase can be closed whilst a first fluid flow can still flow in a first phase.

The mixing valve can be controllable such that it is adjustable as a result of the external force from a closed position, in which a poppet valve or switching valve can be closed, into a position of the first phase, then as a result of further external force into a position of the second phase, then as a result of easing the external force for the second phase back into a position of the first phase and then as a result of further easing or stopping of the external force, once again into the closed position. Said realization considerably reduces design complexity and lowers the risk of possible ingress of dirt as a result of a second fluid flow in a second phase not having to be opened at all in order to enable a fluid flow—a fluid flow from a first phase is sufficient.

The multi-part realization of the valve body also serves for the prevention of malfunctions and total failure as a result of the ingress of dirt. By the valve body being realized in two parts, even in the case where, for example, the valve body part facing the proportional valve part is jammed by dirt or is impaired in its closing function, the valve body part facing the switching valve part is able to terminate a fluid flow. Double security is therefore present in this embodiment.

According to an embodiment of the mixing valve, the switching valve is a poppet valve. Such a poppet valve is suitable and can provide a high closing speed and a low susceptibility to failure.

It is conceivable according to a further embodiment for the proportional valve part to be a gate valve.

According to an embodiment of the mixing valve, one of the springs is realized as a recoil spring and one of the springs is realized as a regulator spring, wherein the recoil spring comprises less rigidity than the regulator spring. As a result of an adjustable external force, the valve body part facing the switching valve part can consequently be adjusted in order to achieve a first phase. The recoil spring is still able to be compressed, and the valve body part facing the proportional valve body can also be adjusted in a time-delayed manner in order to achieve a second phase. The multiple parts of the valve body are thus utilized in a structurally simple manner in order to realize the operation with a multi-phase flow. The recoil spring can be assigned to the proportional valve part and the regulator spring can be assigned to the switching valve part. The time delay is not absolutely necessary. The springs can also be designed in such a manner that the compressions thereof are effected chronologically one after another.

A more specific realization for this purpose provides that the springs are realized in such a manner that a force acting in opposition to the spring forces of the springs initially compresses exclusively the recoil spring and only subsequently or in part simultaneously compresses the regulator spring. The adjustable external force can therefore initially compress the recoil spring exclusively whilst the regulator spring remains uncompressed. The first phase can run through until the recoil spring is compressed. Following this, a greater external force can be applied in order to compress the stiffer regulator spring. This occurs in the second phase. With said realization, the phases are delimitable from one another in time and function but can also run at staggered intervals with respect to one another.

It is conceivable according to an embodiment of the mixing valve that the one valve body part comprises a guide recess for the other valve body part for guiding it in the direction of a longitudinal axis. As a result, secure guiding of the one valve body part by means of the other valve body part can be realized.

As an alternative to this or in addition to it, the mixing valve can comprise a monolithic contact piece which comprises a guide surface for the one valve body part and/or a stop surface for the other valve body part. The guide surface can be distinguished as a result of the valve body part sliding along it parallel thereto, the stop surface can be distinguished as a result of the valve body part abutting against it orthogonally. A reduction in parts can be brought about as a result of the integration of the functions. The contact piece can be part of the valve housing.

In addition to this or as an alternative to it, it is conceivable according to an embodiment of the mixing valve that a monolithic contact piece defines a ring gap at least in regions. Said contact piece can, but does not have to, be the contact piece which includes the guide and stop surface. If such a one, however, is provided, it can fulfill a triple function (guide and stop surface and ring gap formation), which results in a further reduction in parts. The ring gap can be fluidically connected, for example, to the switching valve realized, where applicable, as a poppet valve, and can open out exactly at that point. The contact piece can be part of the valve housing.

It is conceivable according to an embodiment of the mixing valve that one of the springs is arranged as a recoil spring between the valve body part facing the switching valve part and the valve housing and a further one of the springs is arranged as a regulator spring between the valve body part facing the proportional valve part and the valve housing. In the case of said realization, no spring has therefore to be arranged between the two valve body parts—the space is realized in a springless manner. One advantage here is that the position of the recoil spring is realized independently of the position of the valve body part facing the proportional valve part as the recoil spring comprises, at one end, a fixed support on the valve housing or elements which are assigned to said valve housing. The gap between the two valve body parts is consequently free of elements which brake the fluid flow or form a little traversed region. Little traversed or badly traversed regions especially tend to have dirt deposits or residue formation.

According to an embodiment of the mixing valve, the valve body part comprises a support surface for the recoil spring, which support surface is located opposite the other valve body part. The other valve body part can be the valve body part facing the proportional valve part. As a result, the valve body part can be/become pre-stressed in a closed position, for example with a recoil spring designed as a compression spring.

In the case of an embodiment of the mixing valve, the contact piece comprises a support surface for the recoil spring, which support surface is located remotely from the other valve body part. The other valve body part can be the valve body part facing the proportional valve part. In this case, in addition to the functions already named above, the contact piece can also comprise a supporting function for the recoil spring and consequently fulfill a quadruple function. The contact piece can be part of the valve housing.

It is conceivable according to an embodiment of the mixing valve that the recoil spring is arranged in the ring gap. The recoil spring therefore surrounds the valve body part and, for saving space, is arranged in a space that is present where applicable anyway, namely the ring gap.

In the case of an embodiment of the mixing valve, the valve body part comprises at least one fluid channel circumferentially along its longitudinal center axis. The valve body part is therefore able to be flowed around at least in regions, which can have a stabilizing effect on the valve body part. The at least one fluid channel (multiple channels are also conceivable, for example six fluid channels) consequently provides a portion of the fluid line between a feed line and a drainage line.

In the case of an embodiment of the mixing valve, one of the springs is arranged as a recoil spring between the valve body part facing the switching valve part and the valve body part facing the proportional valve part and a further one of the springs is arranged as a regulator spring between the valve body part facing the proportional valve part and the valve housing.

As a result, the valve body parts can be moved independently of one another in a simple manner and a high level of functionality can thus be achieved.

In the case of an embodiment of the mixing valve, the valve body part facing the switching valve part comprises, on its one end, at least one cleaning continuation which is realized and/or arranged in such a manner that it can come into contact with a surface of the valve body part facing the proportional valve part, which surface is located opposite said cleaning continuation. If the mixing valve is traversed, for example, by commercially available tap water as fluid, typical residues can be generated in the mixing valve, such as, for example, lime deposits. Said residues inside the mixing valve are currently not removable or are only removable at a great cost and result initially in flow bottlenecks and ultimately in blocking or total failure of the mixing valve—it is then no longer possible to open the valve. The cleaning continuation fulfills a perpetual cleaning function. Every time the cleaning continuation contacts the surface opposite it, the cleaning continuation, as a result of knocking against said surface, that is to say a force acting in an extensively perpendicular manner with reference to the surface to be cleaned, can break up the residues on the contacted surface. The fragments of residue are then carried out of the mixing valve by the fluid flow. The cleaning continuation can also lead to a modified flow speed in its region and can generate turbulence, which can also have a cleaning effect. The cleaning continuation is distinguished in that it is realized in a lengthened manner in relation to the basic body of the valve body part and extends away from the basic body in a continuation-like manner. It can also be advantageous, according to an embodiment, for a cleaning action that a space is realized on both sides of the cleaning continuation in the circumferential direction of the valve body part. This results in the dirt not being loaded in a uniform manner but experiencing loaded and simultaneously non-loaded portions. In the case of multiple cleaning continuations, they can be realized evenly spaced apart from one another. Said realization is suitable, in particular, in the case of a multipart valve body in order to remove residues between the valve body parts or in order not to allow them to be created in the first place. This results in the mixing valve having long-lasting opening functionality. Multiple cleaning continuations can also have geometrically different designs. In particular, a cleaning surface of each cleaning continuation, which is realized for contacting the surface to be cleaned, can comprise different dimensions, edge contours, edge types, inclinations and/or angulations with reference to other cleaning surfaces of the same valve body part.

According to an embodiment of the mixing valve, the valve body part facing the switching valve part includes at least one rotation mechanism which is realized in order to be able to bring about a rotation of the valve body part about its own longitudinal axis in cooperation with a fluid which is able to flow past. In other words, first of all the movement energy of a fluid flowing past results in the valve body part rotating. Said rotational movement results, in particular, in improved cleaning characteristics as when a surface to be cleaned is contacted there is, as a result, a parallel force component with reference to the surface to be cleaned in addition to the perpendicular force effect. The residues are therefore also abraded and/or sheared off.

It is conceivable according to an embodiment that the rotation mechanism is an inflow surface which encloses, with a direction of flow of the fluid, an acute angle ($\alpha$) within the range of between 0.1° and 45°, preferably between 10° and 20°, even more preferred 15°. As an alternative to the direction of flow, the longitudinal axis can also serve as a reference in order to define the acute angle. Where there is a cleaning continuation present, according to an embodiment, in particular the space adjacent to the cleaning continuation is advantageous since a cleaning edge, which fulfills an advantageous break-up function, can form on the cleaning continuation. The rotation of the valve body part presses the cleaning edge into the residues or scrapes the cleaning edge along the residues in order to break them up.

In addition, the disclosure also includes the use of the mixing valve proposed for mixing waters which are at various temperatures, for example in galley kitchens or toilets in aircraft, such as airplanes.

DETAILED DESCRIPTION

Elements that are identical or correspond to one another are each designated with the same reference symbols in the figures and consequently, unless expedient, will not be described again. The disclosures included in the entire description are transferable analogously to identical parts with the same reference symbols or identical component descriptions. The positional specifications chosen in the description, such as, for example, up, down, to the side etc., also refer to the figure immediately described and shown and, where there is a modification in position, are to be transferred analogously to the new position. In addition, individual features or feature combinations from the various exemplary embodiments shown and described can also provide, per se, solutions that are independent, inventive or according to the disclosure and, unless explicitly excluded, are able to be combinable with all other disclosed features and embodiments.

A first embodiment of the disclosure is shown in FIGS. 1*a* to 3*b* and is described below.

Figure 1A:
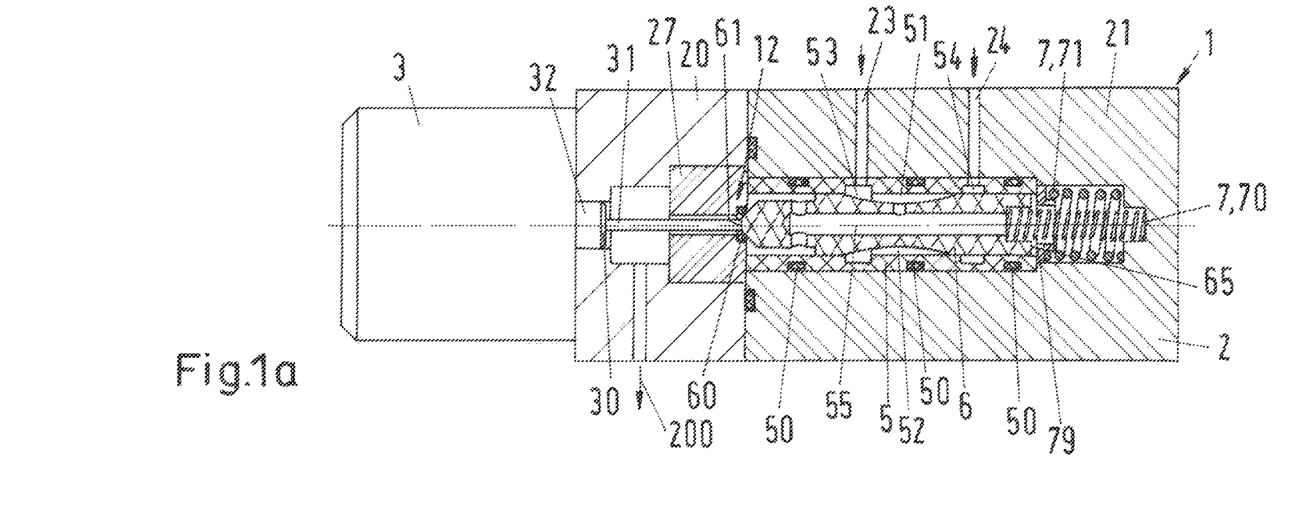
FIGS. 1*a*, 2*a*, 3*a* show a sectional representation of the mixing valve in various positions, in FIG. 3*a* additionally with control-oriented circuitry.

The design of the mixing valve 1, 100, 1000 according to the disclosure is described in particular by way of FIG. 1*a*. Various positions of the mixing valve, which the mixing valve 1 can assume according to FIG. 1*a*, are shown in the sequence of images in FIGS. 1*a*, 2*a* and 3*a*.

The mixing valve 1 shown in FIG. 1*a* consists of a valve housing 2 and an electromagnet 3.

The design of the electromagnet 3 is not shown any further and is, as known to the skilled artisan, realized conventionally. A coil traversed by electric current generates a magnetic field, which moves an armature mounted in an armature chamber, in an embodiment with an armature rod 32, the front end 30 of which acts on a plunger 31. In this case, the armature rod 32 or the plunger 31 is moved in opposition to the force of a spring 7, for example a regulator spring 71 and/or a recoil spring 70.

The mixing valve 1 shown here has a valve housing 2. The valve housing 2 can be of one piece or also of multiple parts, which facilitates the assembly of the individual elements inside the valve housing 2. The mixing valve 1 has a switching valve part 10 which is realized as a poppet valve part and a proportional valve part 11. Consequently, the valve housing 2 also has a first housing part 20, which is predominantly the switching valve part 10, and a second housing part 21 which receives predominantly the proportional valve part 11 of the mixing valve 1.

The valve housing 2, here the second housing part 21, has two feed lines, a first feed line 23 for, for example, cold water and a second feed line 24 for, for example, hot water. It must be mentioned at this point that the mixing valve according to the disclosure is naturally suitable for mixing flowable media (liquids or gases) together in any desired manner; it is, therefore, not a question, in this connection, of the liquid described here, for example water, in various temperature levels. The disclosure can also be applied here to other fluids in a very variable and flexible manner.

A control sleeve 5 is situated in the valve housing 2. Said control sleeve 5 is sealed in relation to the valve housing 2 via multiple O-ring seals 50. The control sleeve 5 has a first radially arranged opening 53, which communicates fluidically with the first feed line 23. In addition, the control sleeve 5 has a second radially arranged opening 54, which communicates fluidically with the second feed line 24. In particular, the O-ring seals 50 are arranged between the various feed lines 23, 24 or openings 53, 54. In this case, the O-ring seals 50 are situated on the circumference of the control sleeve 5.

The control sleeve 5 is hollow on the inside and thus surrounds a valve control chamber 51. Said valve control chamber 51 has multiple part chambers, for example the mixing chamber 52 which is situated, in particular, between the two openings 53, 54.

The elongated valve body 6 is movably mounted in the valve control chamber 51. The valve body 6 is movable along the longitudinal axis 55 of the control sleeve 5. On the first end 60 of the valve body 6 facing the electromagnet 3 there is a contact surface 61 on which the end of the plunger 31 acts and thus transmits the movement of the plunger 31 (obtained by the electromagnet 3) to the valve body 6, see also FIG. 1c. The end 60 of the valve body 6, which faces the electromagnet 3, is additionally realized as a cone 63 and, in the region of the switching valve part 10, forms the valve body part 62, provided for this purpose, for the switching valve 12.

On the second end 65 opposite the first end 60 (see FIG. 1b), the valve body 6 is supported on a spring 7, strictly speaking on the recoil spring 70. The arrangement, in this case, is chosen such that when the electromagnet 3 is not energized, the strength of the recoil spring 7, 70 is such the valve body 6 is offset to the left in the control sleeve 5 in such a manner that the cone 63 on the valve body part 62 closes the switching valve 12 of the switching valve part 10.

The mixing valve 1 is operated such that when the electromagnet 3 is first energized (slightly), a magnetic force is generated which is sufficient to overcome the initial force of only the recoil spring 70 and thus to lift the valve body part 62 on the switching valve 12 out of the valve seat 13 and in this way to open said switching valve 12. The switching valve 12 is a valve which actually only recognizes two states, namely open or closed. In said operating state, the valve body 6 moves a little to the right within the control sleeve 5, in this case compresses the recoil spring 70 a little and consequently closes (see FIG. 2b) the spring gap 69, which is produced between the closing end face 66 on the second end 65 of the valve body 6 and a contact piece 79 (see FIG. 1b). In order to keep the forces for opening the switching valve 12 low, the recoil spring 70 has only low rigidity or spring constant.

Figure 1B:
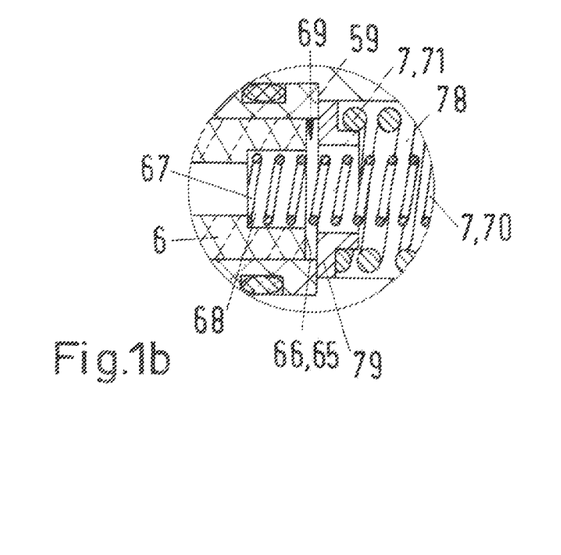
FIGS. 1*b*, 2*b*, 3*b* show an enlarged view of the detail of the arrangement of the valve body on the springs in FIGS. 1*a*, 2*a*, 3*a*.
Figure 1C:
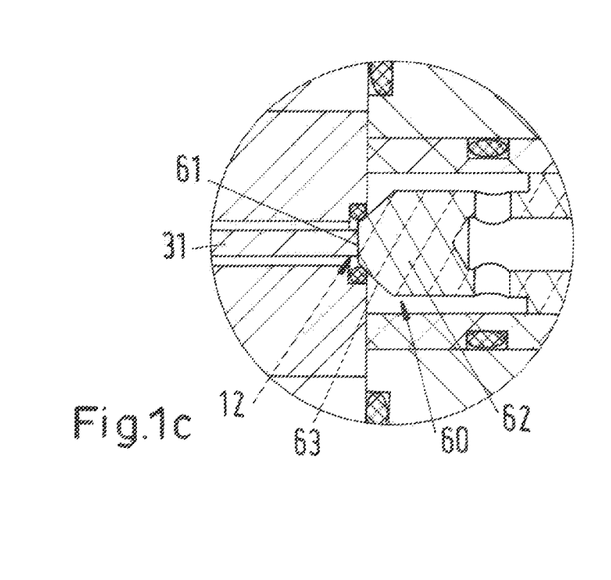
FIGS. 1*c*, 2*c* show an enlarged view of the detail of the bearing arrangement of the valve body on a poppet valve in FIGS. 1*a*, 2*a*.

The recoil spring 70 is supported at one end in the end region of the second end 65 of the valve body 6 and at the other end in the valve housing 2. An axial indentation 68 is provided in the valve body 6 at the end 65 (parallel to the longitudinal axis 55) for supporting the recoil spring 70. Said indentation 68 ends at least with a collar 67 against which the recoil spring 70 abuts in the axial direction.

The recoil spring 70 is supported in the valve housing 2 in a receiving chamber 78, at the bottom of a blind hole 29. Said blind hole 29, in this case, is concentric with respect to the longitudinal axis 55.

The blind hole 29, in this case, is a step bore, i.e., a bore portion, which has a larger diameter and receives a second spring 7, the regulator spring 71, connects in the direction of the control sleeve 5. The regulator spring 71 is supported against the shoulder 28 of the step bore at the one end and at the other end against the contact piece 79 which interacts with the valve body 6. In this case, the contact piece 79 is also axially movable (with reference to the longitudinal axis 55), wherein where the spring gap 69 exists, the regulator spring 71 presses the contact piece 79 in the direction of the control sleeve 5 on the end-face edge thereof and at that point experiences a stop 59 and its movement is consequently delimited.

The assembly, in this embodiment, is in such a manner that a longitudinal bore is introduced into the valve housing 2 as a double step bore, the portion with the two smaller diameters forming the receiving chamber 78 for the springs 7, 70, 71 and the portion with the largest diameter receiving the control sleeve 5. The control sleeve 5, in this case, is pressed into the valve housing 2. The diameter of the contact piece 79 is somewhat greater than the inside diameter of the control sleeve 5 in order to rest evenly on the ring-like stop 59 of the control sleeve 5. The radial stop between the receiving chamber 78 with the greater diameter and the region in which the control sleeve 5 is inserted, positions the control sleeve 5 in the valve housing 2.

The rigidity of the regulator spring 71 is greater than that of the recoil spring 70. The regulator spring is used when the spring gap 69 is closed, that is to say the switching valve 12 is open. The regulator spring 71, in this embodiment, is part of the proportional valve part 11 of the mixing valve 1, for the regulated current which flows through the coil of the electromagnet 3 generates a force which acts in opposition to the resetting force of the regulator spring 71 via the plunger 31 and the valve body 6. This produces the proportional valve part 11 of the mixing valve 1, which serves for the purpose of regulating the proportional valve part 11, realized as a gate valve 14.

The magnetic force for opening the switching valve 12 is greater than the initial spring force of the recoil spring 70 but less than the initial spring force of the regulator spring 71. The designation "initial" refers, in this case, to the fact that this means the force which has to be applied at the start of the respective movement of the valve body 6.

The proportional valve part 11 of the mixing valve 1 is realized as a gate valve 14. For this purpose, the valve body 6 has a second valve body part 64 which takes on said regulating task.

Noteworthy in this embodiment is that the second valve body part 64 is arranged in the longitudinal region of the valve body 6 and the same valve body 6 comprises on its end face the first valve body part 62 which serves for the switching valve 12.

The valve body 6 has on its lateral surface approximately in the center a constriction 68 which describes approximately 20-40% of the overall length of the valve body 6. Said constriction 68 extends in the circumferential direction over part, in a manner over the entire circumference, of the valve body 6. A radial (with reference to the longitudinal axis 55) bore 600 is situated centrally in the region of said constriction 68. Said radial bore 600 opens out into an axially (with reference to the longitudinal axis 55) extending blind hole 601, which is open at the end 65 of the valve body 6 facing the receiving chamber 78 and is closed in the direction of the electromagnet 3.

In the region of the end 60 of the valve body 6 facing the electromagnet 3, said valve body has, in turn, radial (with reference to the longitudinal axis 55) bores 602. Said bores 602 also open out into the blind hole 601 in the interior.

The valve body 6 has two control edges 603 and 604 which interact in a suitable manner with the openings 53, 54 of the control sleeve 5. The constriction 68 is situated between the two control edges 603 and 604. In this embodiment, the control edges 603 and 604 are situated in regions of the valve body 6 with a large diameter in such a manner that the valve body 6 here also experiences guidance inside the control sleeve 5.

In this embodiment, the control edges 603 and 604 also form a seal inside the valve control chamber 51 in the axial direction (with reference to the longitudinal axis 55).

The valve body 6 has a smaller diameter in the end portion 605 thereof, in such a manner that a ring gap 606 is realized here which communicates fluidically with the radial bores 602.

Consequently, the ring gap 606 communicates fluidically with the constriction 68 via the radial bore 602, the longitudinally extending blind hole 601 and the radial bore 600. The ring gap 606 opens out into the region of the switching valve 12, which is formed by the valve seat 13, which is controlled by the conical end 60 of the valve body part 62.

With the mixing valve 1 in the switching state shown in FIG. 1a, the switching valve 12 is closed, and the valve body 6 is also positioned in the control sleeve 5 of the gate valve 14 such that the control edge 604 also closes the second inflow 24. Consequently, only the liquid conveyed via the first feed line 23 via the opening 53 of the control sleeve 5, is pending at the mixing chamber 52, the radial bore 600, the axial blind hole 601, the radial bore 602 and the ring gap 605 on the switching valve 12 of the switching valve part 10 of the mixing valve 1. Consequently, the liquid (for example cold water) conveyed via the feed line 23 bears against the switching valve 12.

As already described, the valve body 6 is moved by the plunger 31 in opposition to the force of the springs 7. In this case, the plunger 31, in a penetration bore, penetrates a valve block 27 which is arranged between the electromagnet 3 and the control sleeve 5. Said valve block 27 receives the valve seat 13 of the switching valve 12; see also, for example, FIG. 2c. Said penetration bore is also simultaneously a media line 26 which connects the region (in the direction of flow of the medium) downstream of the switching valve 12 to the drainage line 200.

Figure 2A:
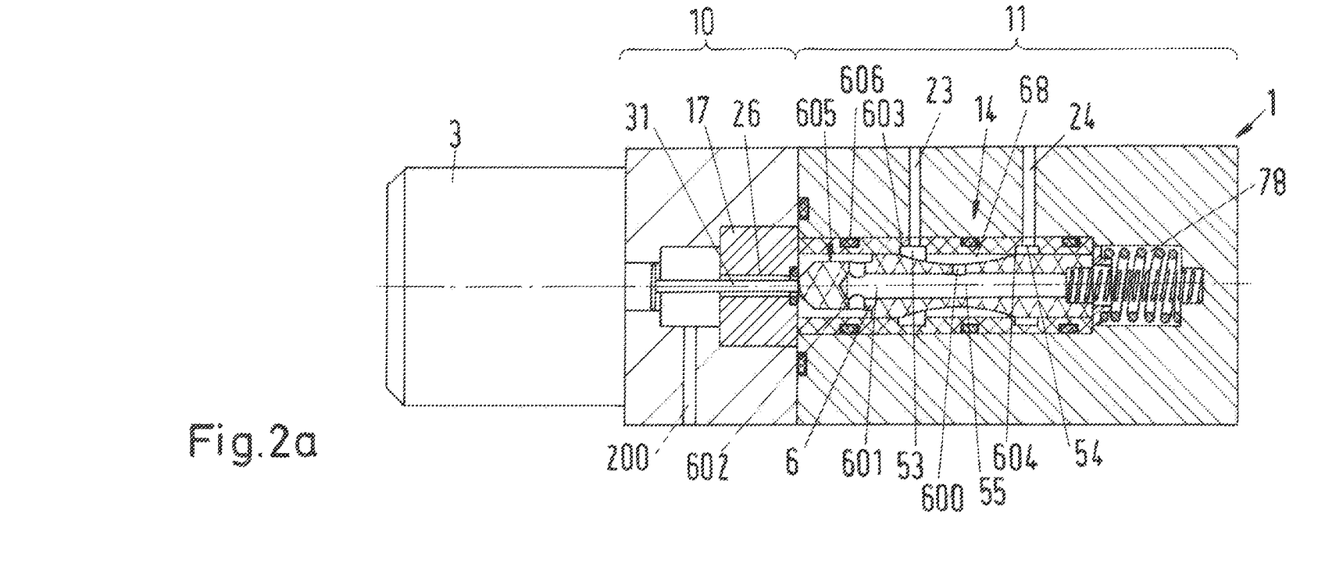
Figure 2B:
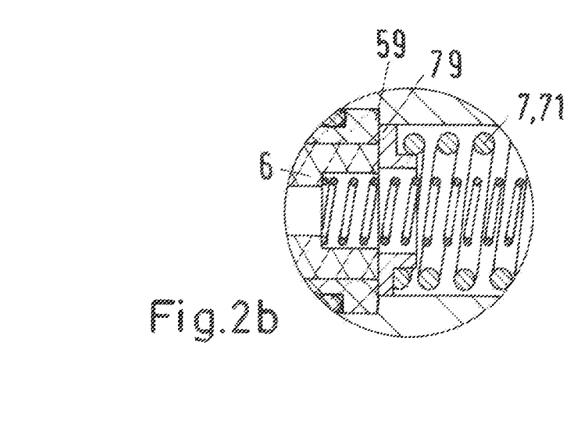
Figure 2C:
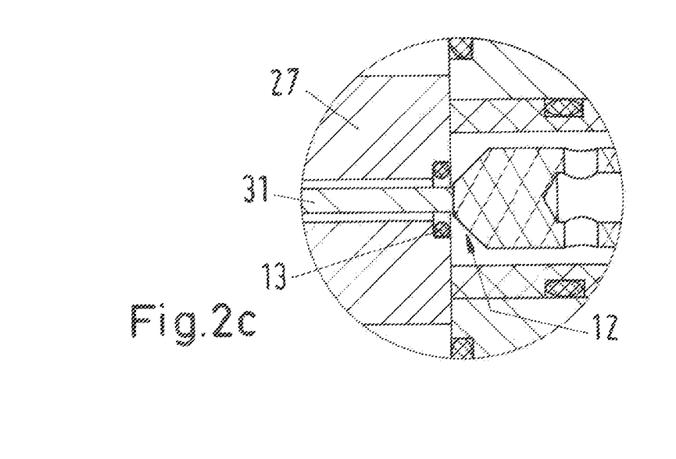

If the mixing valve 1 is then opened, that is to say the mixing valve 1 is transferred from the state according to FIG. 1a into the state according to FIG. 2a, the medium conveyed by the first feed line 23 and located upstream of the switching valve 12 then flows immediately into the drainage line 200.

In the state shown in FIG. 2a, no regulating or mixing of the media provided via the feed lines 23, 24 takes place. The control edge 604 still closes the feed line 24, the end 65 of the valve body 6 remote from the electromagnet 3 bears especially against the stop piece 79 (the spring gap 69 is closed) and the regulator spring 71, which is part of the proportional valve part 11, is not quite yet active.

Figures 3A, 3B:
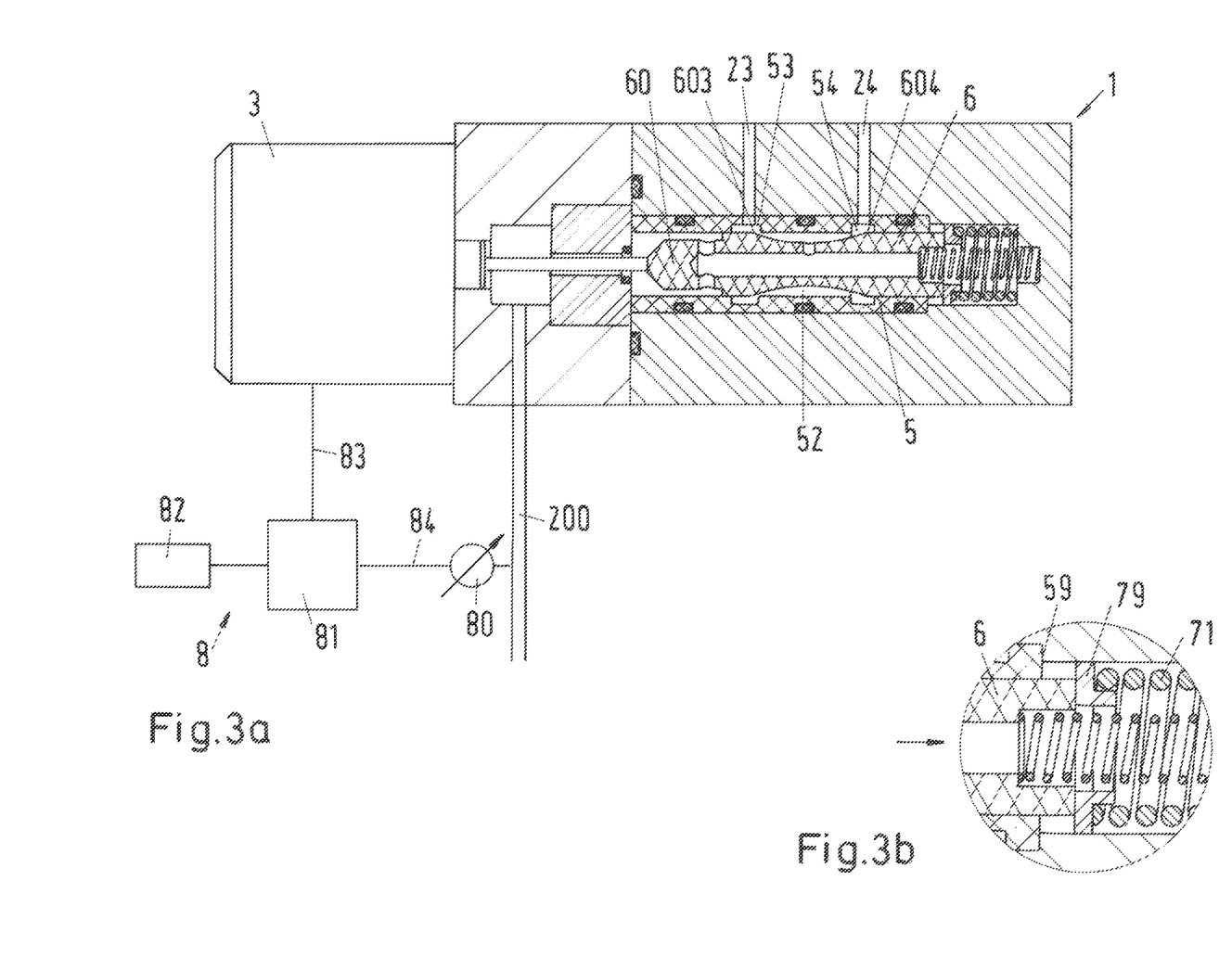

If the electric current flowing through the coil of the electromagnet 3 is then increased, the force acting via the plunger 31 on the valve body 6 also increases and the valve body 6 is now also moved in opposition to the force of the regulator spring 71, as a result of which the regulating process, that is to say the proportional region of the mixing valve 1, begins. Said position is shown in FIG. 3a and also FIG. 3b. It can easily be seen that the contact piece 79 is lifted from the stop 59, that is to say is offset axially to the right, as a result of which the resetting force of the regulator spring 71 (which is also greater on account of the greater rigidity) now also acts in addition to the resetting force of the coil spring 70.

It can easily be seen in FIG. 3a that the valve body 6 is positioned in the control sleeve 5 such that the control edge 603 opens the opening 53 at least in part, as a result of which a fluidic connection is made between the mixing chamber 52 and the feed line 23. At the same time as the valve body 6 has said position in the control sleeve 5, the control edge 604 is also positioned such that the opening 54 is also opened at least in part and, as a result, a fluidic connection is also provided between the mixing chamber 52 and the feed line 24. The media (which can be at least different characteristics such as, for example, hot and cold, or can be of a different type), which are provided via the feed lines 23, 24, can be thoroughly mixed with one another in the mixing chamber 52 in this way and then can drain out at the open switching valve 12 via the path to the drainage line 200 already described.

FIG. 3a shows another control circuit 8. A sensor 80, which determines a characteristic of the mixed medium, for example the temperature, is provided in the drainage line 200. Said sensor data is forwarded as an actual value via a data line 84 to the controller 81, where the measured actual value (for example temperature) is compared with the required value set by the regulator 82 and is then re-adjusted in a suitable manner via the characteristic curves, which are filed for this purpose in the controller 81, via the control lines 83 of the electromagnet 3 in order to generate the desired result at the drainage line 200.

Figure 4A:
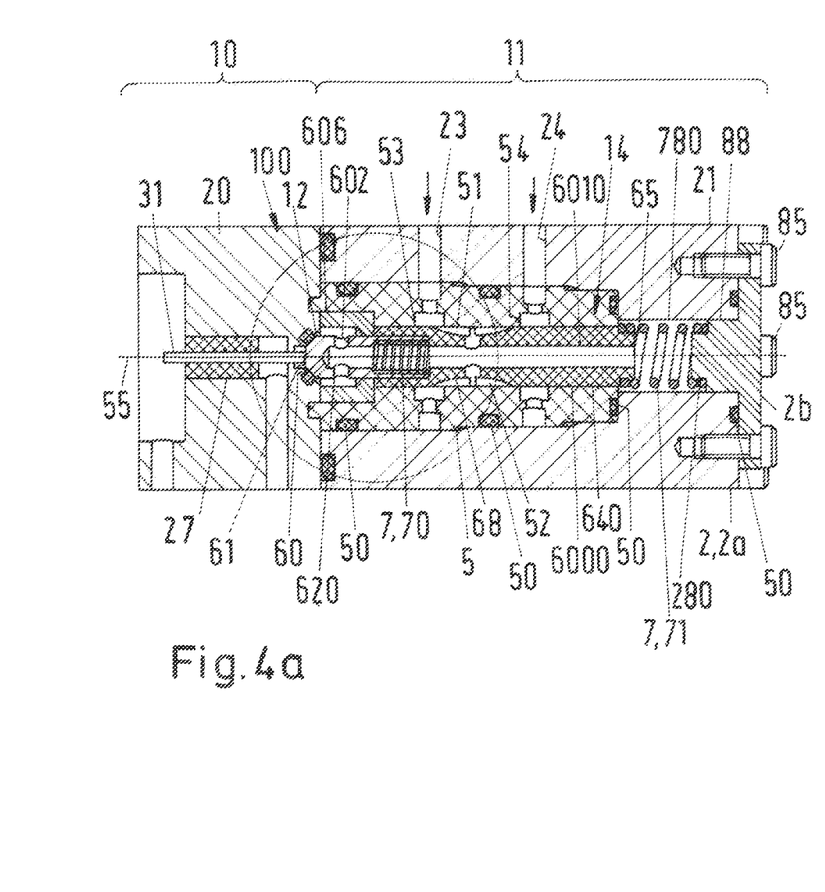
FIG. 4*a* shows a sectional representation of a second embodiment of the mixing valve.
Figure 4B:
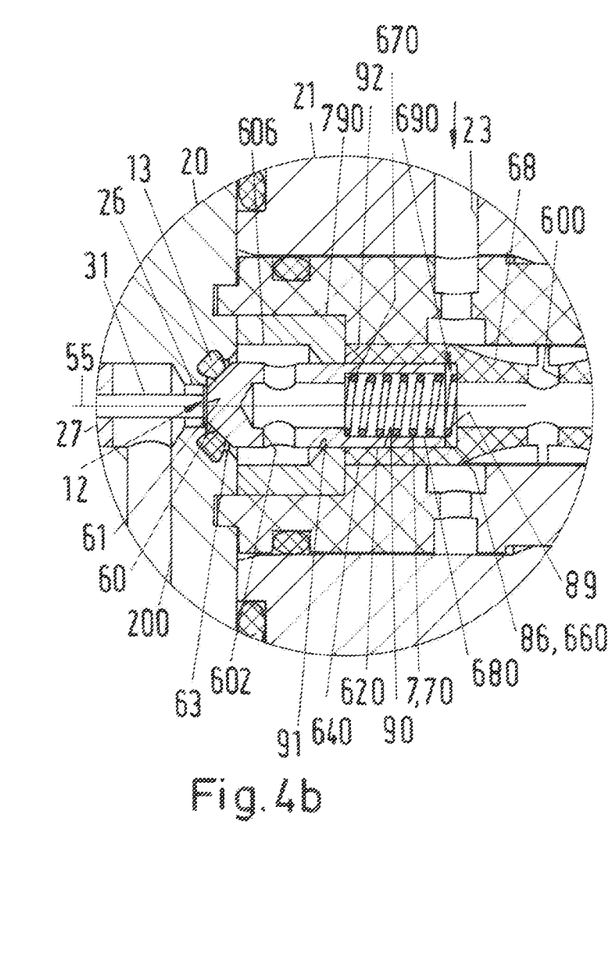
FIG. 4*b* shows an enlarged view of the detail of the bearing arrangement of the valve body on a poppet valve in FIG. 4*a*.

A second embodiment of the disclosure is shown in FIGS. 4a and 4b and is described below.

The design of the mixing valve 100 according to the disclosure according to the second embodiment is described in particular by means of FIG. 4a, wherein, in order to avoid repetitions, the differences to the embodiment according to FIGS. 1a to 3b, which relate, in particular, to the mixing valve 1, shall be discussed.

The mixing valve 100 shown in FIG. 4a includes a valve housing 2 and an electromagnet 3, which is not shown and which, however, is arranged on the left-hand side on the housing 2 as shown in the preceding figures.

The mixing valve 100 shown here has a valve housing 2. The valve housing 2 is not realized in two parts as the embodiment of preceding FIGS. 1a to 3b but in three parts, which facilitates the assembly of the individual elements within the valve housing 2. In addition to the housing parts 21 and 22 (housing body 2a), the valve housing 2 therefore includes a cover 2b which is screwed onto the housing body 2a by means of screws 85 and closes said housing body. The mixing valve 100 has a switching valve part 10 and a proportional valve part 11. The valve housing 2 or the housing body 2a preferably also consequently has a first housing part 20 which receives predominantly the switching valve part 10 and a second housing part 21 which receives predominantly the proportional valve part 11 of the mixing valve 100.

The valve housing 2 has, as described above, a first feed line 23 and a second feed line 24, however, of the three mentioned O-ring seals 50 one is not arranged on the circumference of the control sleeve 5 but on the end face thereof facing the cover 2b.

In contrast to the valve body 6 of the first embodiment, the valve body 6000 is designed with multiple parts, including two separate valve body parts 620 and 640. The valve body part 620 faces and/or is assigned to the switching valve part 10 and the valve body part 640 faces and/or is assigned to the proportional valve part 11. They can, consequently, also be designated as switching valve part 620 and proportional valve part 640. On the first end 60 of the valve body 6000 facing the electromagnet 3, there is a contact surface 61, on which the end of the plunger 31 acts and thus transmits the movement of the plunger 31 (attracted by the electromagnet 3) onto the valve body part 620 of the valve body 6000, see also FIG. 4b. The end 60 of the valve body part 620, which faces the electromagnet 3, is additionally realized as a cone 63 and forms in the region of the switching valve part 10 the valve body part, provided for this purpose, for the switching valve 12.

A collar 670, against which the valve body part 620 of the valve body 6000 is supported on a spring 7, strictly speaking on the recoil spring 70, is arranged in the region of a third end 86 located opposite the first end 60. The arrangement, in this case, is chosen such that when the electromagnet 3 is not energized, the strength of the recoil spring 70 is such that the valve body part 620 is offset to the left in the control sleeve 5 in such a manner that the cone 63 on the valve body part 620 closes the switching valve 12 of the switching valve part 10. The recoil spring 70 is supported at the other end on the fourth end 87 of the valve body part 640. In other words, the recoil spring 70 is arranged supporting itself at both ends between the two valve body parts 620 and 640. The one valve body part 640 comprises a guide recess 90 for the other valve body part 620 for guiding the same in the direction of the longitudinal axis 55.

The mixing valve 100 is operated such that when the electromagnet 3 is first energized (slightly), a magnetic force is generated which is sufficient to overcome the initial force of only the recoil spring 70 and thus to lift the valve body part 620 on the switching valve 12 out of the valve seat 13 and thus to open said switching valve 12. In the open operating state, the valve body part 620 is moved a little to the right within the control sleeve 5, and at the same time compresses the recoil spring 70 a little and consequently closes (see FIG. 4*b*) the spring gap 690 which is produced between the closing end face 660 on the third end 86 of the valve body part 620 and an end face 89 of the valve body part 640 (see FIG. 4*b*). In order to keep the forces for opening the switching valve 12 low, the recoil spring 70 only has low rigidity or spring constant.

An axial (parallel to the longitudinal axis 55) indentation 680 is provided for the support of the recoil spring 70 in the valve body part 620. Said indentation 680 ends at least with the collar 670 against which the recoil spring 70 abuts in the axial direction.

A receiving chamber 780, which, in this case, is designed concentrically to the longitudinal axis 55, is realized in the housing part 21. A step portion 88 of the cover 2*b* projects into the receiving chamber 780 with a shoulder 280. The receiving chamber 780 receives the regulator spring 71. The regulator spring 71 is supported against the shoulder 280 of the step portion 88 at the one end and at the other end is supported directly against the valve body part 640 which interacts with the valve body part 620.

The rigidity of the regulator spring 71 is greater than that of the recoil spring 70. The regulator spring 71 is used when the spring gap 690 is closed, that is to say the switching valve 12 is open. The regulator spring 71, in this case, is part of the proportional valve part 11 of the mixing valve 100, for the regulated current which flows through the coil of the electromagnet 3, generates a force which acts via the plunger 31 and the valve body part 620 in opposition to the resetting force of the regulator spring 71. In order then to activate the proportional valve part 11 of the mixing valve 100, which serves for the purpose of regulating the proportional valve part 11 realized as gate valve 14, a further increased force has now to be applied so that even the more rigid regulator spring 71 is compressed.

The magnetic force for opening the switching valve 12 is greater than the initial spring force of the recoil spring 70 but less than the initial spring force of the regulator spring 71.

The proportional valve part 11 of the mixing valve 100 is designed as a gate valve 14. To this end, the valve body 6000 has the second valve body part 640 which takes over said regulating task.

Noteworthy in this embodiment is that said second valve body part 640 is arranged in the longitudinal region of the valve body 6000 and, on its end face, the two-part valve body 6000 comprises, as a separate element, the first valve body part 620 which serves for the switching valve 12.

On its lateral surface approximately in the center, the valve body 640 has a constriction 68 which describes approximately 20-50% of the overall length of the valve body part 640. Said constriction 68 extends in the circumferential direction over part, in a manner over the entire circumference, of the valve body part 640. A radial (with reference to the longitudinal axis 55) bore 600 is situated centrally in the region of said constriction 68. Said radial bore 600 opens out into an axially (with reference to the longitudinal axis 55) extending bore 6010 which is open on both sides in the direction of the longitudinal axis 55. In order to prevent fluid leaking out of the valve housing 2, the cover 2*b* is sealed by means of an O-ring seal 50 in relation to the valve housing 2.

In the region of the end 60 of the valve body 620 facing the electromagnet 3, said valve body part has, in turn, radial (with reference to the longitudinal axis 55) bores 602. Said bores 602 open out into a blind hole of the valve body part 620 in the interior.

The valve body part 620 has a smaller diameter than the valve body part 640 in the end portion 605 of the valve body 6000 in such a manner that a ring gap 606 is realized here with a monolithic contact piece 790 which communicates fluidically with the radial bores 602. Consequently, the ring gap 606 communicates fluidically with the constriction 68 via the radial bore 602, the longitudinally extending blind hole in the valve body part 620, the bore 6010 and the radial bore 600. The ring gap 606 opens out into the region of the switching valve 12, which is formed by the valve seat 13, which is controlled by the valve body part 620 provided with the cone 63.

With the mixing valve 1 in the switching state shown in FIG. 4*a*, the switching valve 12 is closed, and the valve body 640 is also positioned in the control sleeve 5 of the gate valve 14 such that the control edge 604 also closes the second inlet 24. Consequently, only the fluid conveyed via the first feed line 23 via the opening 53 of the control sleeve 5 realized in a ring-shaped manner in FIG. 4*a* is pending at the mixing chamber 52, the radial bore 600, the axial bore 6010, the longitudinally extending blind hole in the valve body part 620, the radial bore 602 and the ring gap 605 on the switching valve 12 of the switching valve part 10 of the mixing valve 100. Consequently, the liquid (for example cold water) conveyed via the feed line 23 bears against the switching valve 12.

As already described, the valve body part 620 is moved by the plunger 31 in opposition to the force of the recoil spring 70. In this case, the plunger 31, in a penetration bore, penetrates the valve block 27 which is arranged between the electromagnet 3 and the contact piece 790. The housing part 20 receives the valve seat 13 of the switching valve 12, see also, for example, FIG. 4*b*. The penetration bore is also simultaneously a media line 26 which connects the region (in the direction of flow of the medium) downstream of the switching valve 12 to the drainage line 200.

The monolithic contact piece 790 includes a guide surface 91 for the one valve body part 620 and a stop surface 92 for the other valve body part 640.

If the mixing valve 100 is then opened, the medium conveyed by the first feed line 23 and located upstream of the switching valve 12 then flows immediately into the drainage line 200.

Analogously to FIG. 2*a*, no regulation or mixing of the media, which are provided via the feed lines 23, 24, takes place for the case where the control edge 604 still closes the feed line 24, although the switching valve 12 is already open. The end 86 of the valve body part 620 remote from the electromagnet 3 bears especially against the end face 89 of the valve body part 640 (the spring gap 690 is closed) and the recoil spring 70 is compressed constructively as extensively as possible and the regulator spring 71, which is part of the proportional valve part 11, is not quite yet active.

If the electric current guided through the coil of the electromagnet 3 is then increased, the force acting on the valve body part 620 via the plunger 31 also increases and the valve body part 640 is now also moved in opposition to the force of the regulator spring 71, as a result of which the regulating process, that is to say the proportional region of the mixing valve 100, begins.

When the electromagnet 3 is energized further, it is clear that the valve body part 640 is positioned in the control sleeve 5 such that the control edge 603 opens the opening 53 at least in part, as a result of which a fluidic connection is made between the mixing chamber 52 and the feed line 23. At the same time as the valve body part 640 is positioned in the control sleeve 5, the control edge 604 is also positioned such that the opening 54, which is realized in a ring-shaped manner in FIG. 4a, is also opened at least in part and, as a result, a fluidic connection between the mixing chamber 52 and the feed line 24 is also provided. The media (which can be at least different characteristics such as, for example, hot and cold, or can be of a different type), which are provided via the feed lines 23, 24, can be thoroughly mixed with one another in this way in the mixing chamber 52 and can then flow out at the open switching valve 12 via the path to the drainage line 200 already described.

Figure 5A:
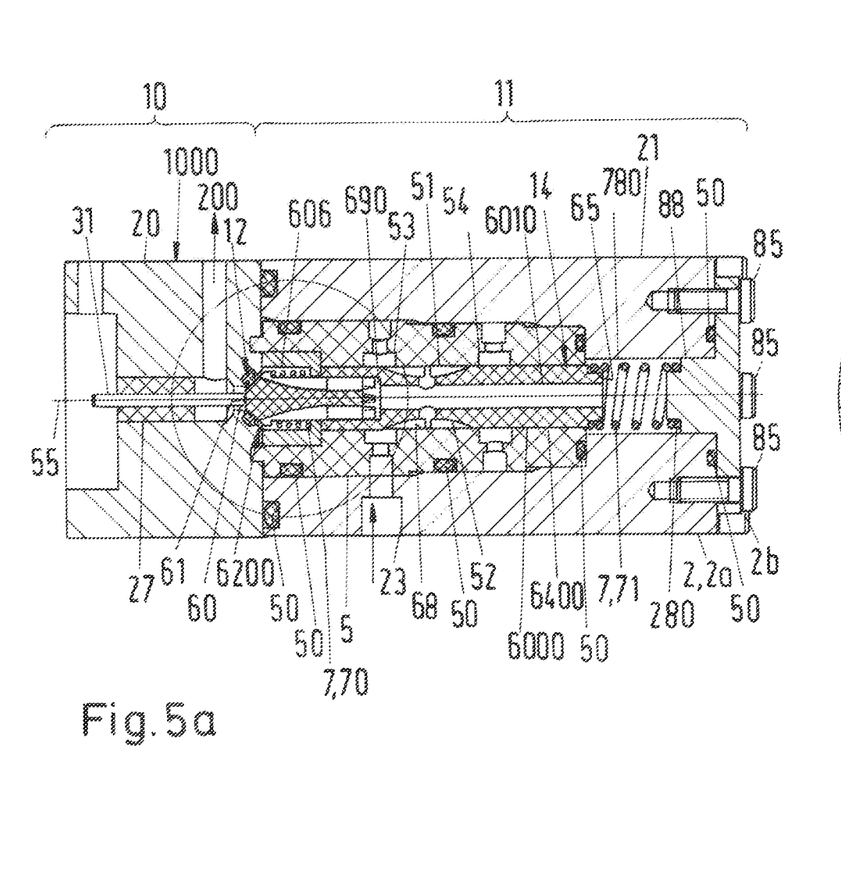
FIG. 5*a* shows a sectional representation of a third embodiment of the mixing valve.
Figure 5B:
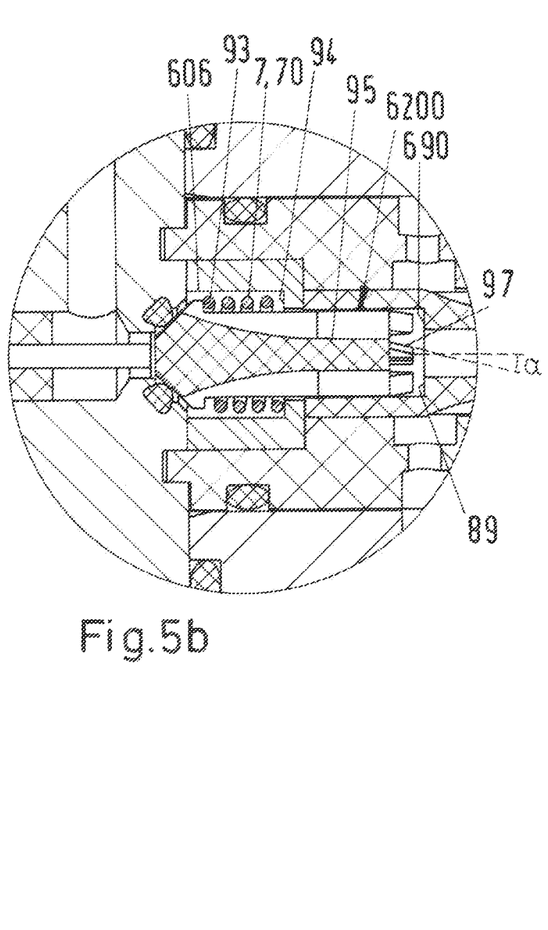
FIG. 5*b* shows an enlarged view of the detail of the bearing arrangement of the valve body on a poppet valve in FIG. 5*a*.
Figure 6A:
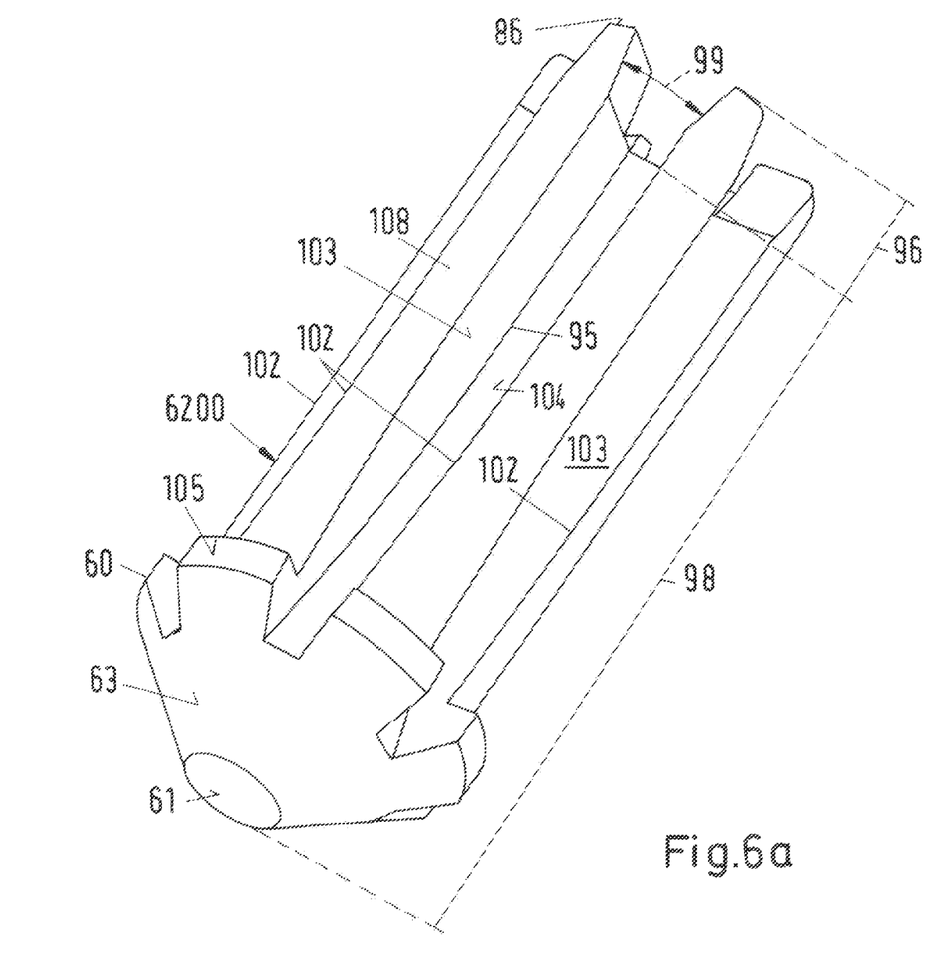
FIG. 6*a* shows a perspective view of a valve body part.
Figure 6B:
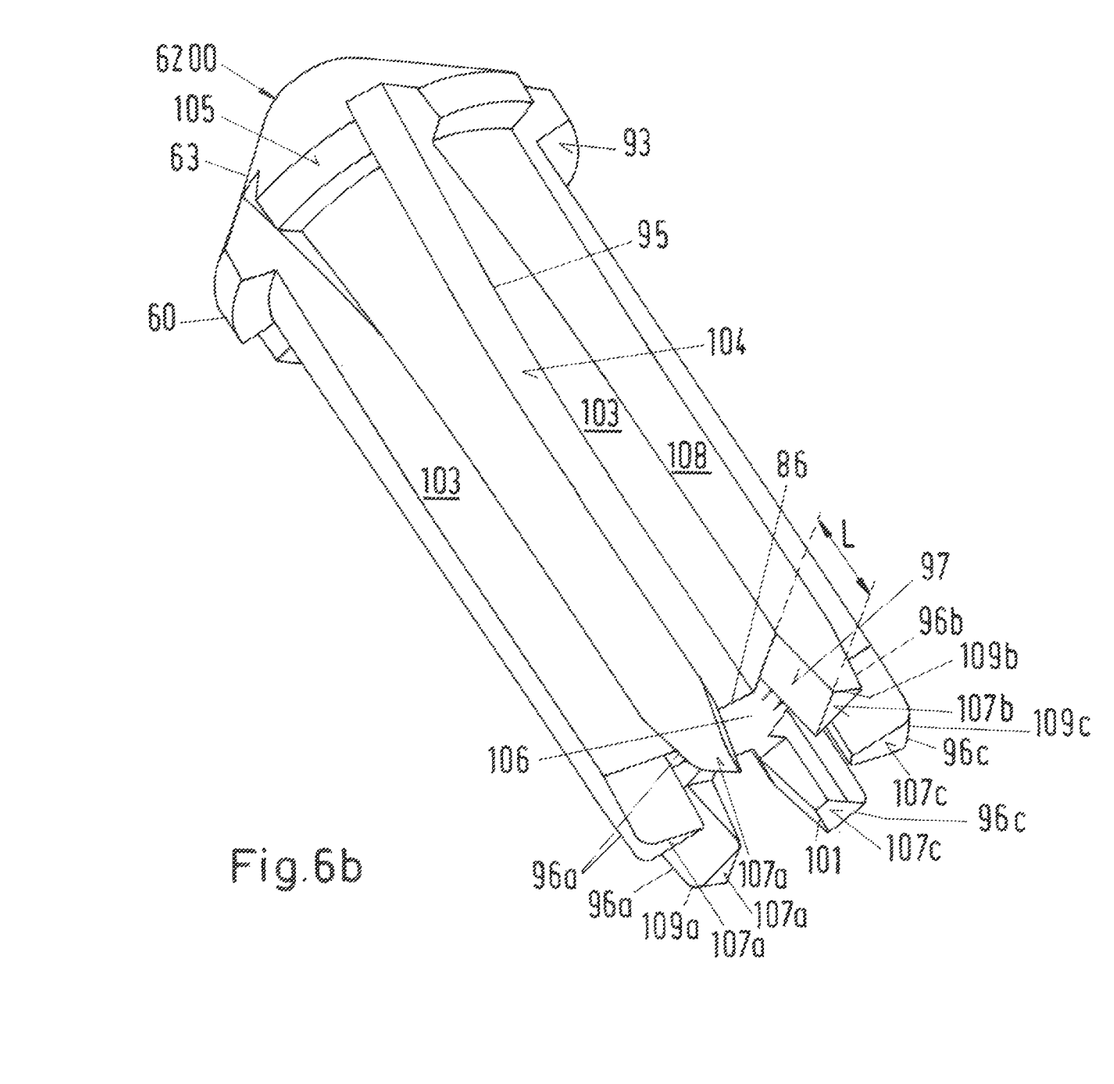
FIG. 6*b* shows a further perspective view of a valve body part according to FIG. 6*a*.

A third embodiment of the disclosure is shown in FIGS. 5a and 5b and is described below. FIGS. 6a and 6b show the valve body part imaged in FIGS. 5a and 5b on its own; the use thereof, however, is not limited to the third embodiment.

The design of the mixing valve 1000 according to the third embodiment is described, in particular, by means of FIG. 5a, wherein, in order to avoid repetitions, in particular the differences to the embodiment according to FIGS. 4a and 4b shall be discussed.

The mixing valve 1000 includes a modified valve housing part 6200 and an altered spring arrangement. One of the springs 7 is arranged as a recoil spring 70 between the valve housing 2 and the valve body part 6200. A further one of the springs 7 is arranged as a regulator spring 71 between the valve body part 6400 facing the proportional valve part 11 and the valve housing 2. The recoil spring 70 is consequently no longer supported at the one end on the other valve body part 6400 but rather on the valve housing 2 or the contact piece 790 thereof. For this purpose, the contact piece 790 comprises the support surface 94 for the recoil spring 70. The support surface 94 is located remotely from the other valve body part 6400. At the other end, the recoil spring 70 is supported against the support surface 93 on the valve body part 6200 which is located opposite the other valve body part 6400.

The feed lines 23, 24 are no longer realized in parallel in the second housing part 21. Only the feed line 23 is shown, the feed line 24 is present but is not illustrated on account of the perspective.

Looking at FIG. 5a, it can be seen that the recoil spring 70 is arranged in the ring gap 606 which is defined by the contact piece 790.

FIGS. 6a and 6b show the valve body part 6200 on its own. The valve body part 6200 comprises a basic body 98 with one end 60 and another end 86 which is located opposite to said end 60. The tapered cone 63, which can come to abut against the valve seat 13, is realized on the end 60. The cone 63 tapers toward the contact surface 61, on which the end of the plunger 31 can act. The support surface 93 on the valve body part 6200 for the recoil spring 70 can be seen clearly in FIG. 6b.

The valve body part 6200 is realized in a segmented manner along its longitudinal center axis. Each formed segment comb 102 is set back in relation to a head circumferential surface 105 defined by the cone 63. The setback forms the support surface 93. One fluid channel 95 is realized in each case between two adjacent segment combs 102. With their side wall surfaces 103 which are located opposite one another, adjacent segment combs 102 delimit the fluid channel 95 along with an outside surface 104 of the basic body 98 which is realized in the base of the fluid channel 95. The difference here is the outside surface 108 of each segment comb 102. Each fluid channel 95 extends in regions parallel to the longitudinal center axis 55 and, as it gets closer to the contact surface 61, rises in relation to the longitudinal center axis 55, as shown in particular in FIG. 5b.

The basic body 98 ends at the end 86 with an end surface 106. Six cleaning continuations 96a, 96b and 96c, which have similarities but also differ in their specific design, are arranged on the basic body 98 jutting out from said end surface 106 or in relation to said end surface in the direction of the longitudinal center axis 55 and in opposition to the direction of flow of the fluid.

Common to the cleaning continuations 96a, 96b and 96c is that a space 99 is realized between each adjacent cleaning continuation 96—the individual column-like cleaning continuations 96 are therefore not connected to one another but are delimited from one another by means of the spaces 99. Each cleaning continuation 96 is realized as an extension of a segment comb 102 so that in each case a monolithic cleaning continuation segment comb is formed. The length L of the cleaning continuations 96a, 96b, 96c is dimensioned such that a cleaning surface 107a, 107b, 107c arranged on the end of the cleaning continuation 96 can come into contact with an end face 89 of the valve body part 6400 located opposite it when the spring gap 690 is closed. It is precisely the end face 89 that tends to form deposits which impair valve functionality. Each cleaning continuation 96 can have a substantially circle-segment-like form in cross section.

The cleaning continuations 96a, 96b and 96c differ substantially by the following features. Cleaning continuations 96 that are realized dissimilarly to one another result in force being applied to the deposit asymmetrically, which increases the cleaning action considerably.

The realization of a monolithic cleaning continuation segment comb per segment comb 102/cleaning continuation 96 can result in the outside surface 108 of the segment comb 102 also being able to become, without interruption, the outside surface 108 of the cleaning continuation 96. In the embodiment of the cleaning continuation 96a, present in triplicate, the corresponding outside surface 108 merges into a transition 109a realized as a radius and then into the cleaning surface 107a. In the embodiment of the cleaning continuation 96b, present once, the corresponding outside surface 108 ends in a transition 109b realized as an edge. The cleaning surface 107b connects to said edge orthogonally with respect to the outside surface 108. In the embodiment of the cleaning continuation 96c, present twice, the corresponding outside surface 108 merges into a transition 109c realized as a radius and then into the cleaning surface 107c, said radius being realized greater than the radius of the transition 109a. The cleaning continuations 96 each taper acutely from the end surface 106, which results in the case of the cleaning continuations 96a and 96b in the realization of a triangular cleaning surface 107a, 107b and in the embodiment of the two cleaning continuations 96c in a trapezoidal cleaning surface 107c.

A rotation mechanism in the form of an inflow surface 97 can be realized over the length L of cleaning continuations 96. Each inflow surface 97 is angled in relation to an adjacent side wall surface 103. Each inflow surface 97 encloses with the direction of flow of the fluid or the longitudinal center axis 55 an acute angle (α) of 15°. The fluid flowing past presses against the inflow surface 97 and part of the movement energy of the fluid flow is utilized in order to be able to cause the valve body part 6200 to rotate about its own longitudinal axis. A cleaning edge 101, which extends substantially radially, is realized on the side of each cleaning continuation 96 located opposite the inflow surface 97. Each cleaning edge 101 lies between the cleaning surface 107 and a side wall surface of the respective cleaning continuation 96.

The claims submitted now with the application and subsequently are without prejudice to the attainment of further protection.

Should it prove here on closer inspection, in particular also of the relevant prior art, that the one or other feature is certainly favorable to the object of the invention but is not of decisive importance, wording which no longer comprises such a feature, in particular in the main claim, is obviously already our intention. Even such a sub-combination is covered by the disclosure of said application.

It must be noted additionally that the designs and variants of the invention described in the various embodiments and shown in the figures can be combined together as desired. In this case, individual or multiple features are interchangeable with one another as desired. Said feature combinations are also disclosed herewith.

The references stated in the dependent claims point to the further realization of the object of the main claim by the features of the respective subclaim. However, these are not to be understood as a waiver of the attainment of independent, objective protection for the features of the referred subclaims.

Features, which have only been disclosed in the description or also individual features from claims which include a plurality of features, can be adopted at any time in the independent claim/claims as being of inventive importance for delimitation from the prior art, even if such features have been mentioned in conjunction with other features or obtain particularly favorable results in conjunction with other features.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCES

1 Mixing valve
2 Valve housing
2a Housing body
2b Cover
3 Electromagnet
5 Control sleeve
6 Valve body
7 Spring
8 Control circuit
10 Switching valve part
11 Proportional valve part
12 Switching valve
13 Valve seat
14 Gate valve
20 First housing part
21 Second housing part
23 Feed line
24 Feed line
26 Media line
27 Valve block
28 Shoulder
29 Blind hole
30 End
31 Plunger
32 Armature rod
50 O-ring seal
51 Valve control chamber
52 Mixing chamber
53 Opening
54 Opening
55 Longitudinal axis
59 Stop
60 First end
61 Contact surface
62 Valve body part
63 Cone
64 Valve body part
65 Second end
66 End face
67 Collar
68 Constriction
69 Spring gap
70 Recoil spring
71 Regulator spring
78 Receiving chamber
79 Contact piece
80 Sensor
81 Controller
82 Regulator
83 Control line
84 Data line
85 Screw
86 Third end
88 Step portion
89 End face
90 Guide recess
91 Guide surface
92 Stop surface 93 Support surface
94 Support surface
95 Fluid channel
96 Cleaning continuations
96a Cleaning continuation
96b Cleaning continuation
96c Cleaning continuation
97 Inflow surface
98 Basic body
99 Space
100 Mixing valve
101 Cleaning edge
102 Segment comb
103 Side wall surface
104 Outside surface
105 Head circumferential surface
106 End surface
107 Cleaning surfaces
107a Cleaning surface
107b Cleaning surface
107c Cleaning surface
108 Outside surface
109a Transition
109b Transition
109c Transition
200 Drainage line
280 Shoulder
600 Radial bore
601 Blind bore
602 Radial bore
603 Control edge
604 Control edge
605 End portion
606 Ring gap
620 Valve body part
640 Valve body part
660 End face
670 Collar
680 Indentation
690 Spring gap
780 Receiving chamber
790 Contact piece
1000 Mixing valve
6000 Valve body
6010 Bore
6200 Valve body part
6400 Valve body part

The invention claimed is:

1. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein one of the at least one spring is realized as a recoil spring and one of the at least one spring is realized as a regulator spring, wherein the recoil spring comprises less rigidity than the regulator spring.

2. The mixing valve as claimed in claim 1, wherein the switching valve part is a poppet valve.

3. The mixing valve as claimed in claim 1, wherein the proportional valve part is a gate valve.

4. The mixing valve as claimed in claim 1, wherein the one valve body part comprises a guide recess for the other valve body part for guiding it in the direction of a longitudinal axis.

5. The mixing valve as claimed in claim 1, wherein the recoil spring is between the valve body part facing the switching valve part and the valve housing and the regulator spring is between the valve body part facing the proportional valve part and the valve housing.

6. The mixing valve as claimed in claim 5, wherein the valve body part comprises a support surface for the recoil spring, which support surface is located opposite the other valve body part.

7. The mixing valve as claimed in claim 1, wherein the valve body part comprises at least one fluid channel circumferentially along its longitudinal center axis.

8. The mixing valve as claimed in claim 1, wherein the recoil spring is arranged between the valve body part facing the switching valve part and the valve body part facing the proportional valve part and the regulator spring is arranged between the valve body part facing the proportional valve part and the valve housing.

9. The mixing valve as claimed in claim 1, wherein the valve body part facing the switching valve part includes at least one rotation mechanism which is realized in order to be able to bring about a rotation of the valve body part about its own longitudinal axis in cooperation with a fluid which is able to flow past.

10. The mixing valve as claimed in claim 9, wherein the at least one rotation mechanism is an inflow surface which encloses with a direction of flow of the fluid an acute angle ($\alpha$) within the range of between 0.1° and 45°.

11. The mixing valve as claimed in claim 10, wherein the acute angle ($\alpha$) is within the range of between 10° and 20°.

12. The mixing valve as claimed in claim 11, wherein the acute angle ($\alpha$) is 15°.

13. The use of a mixing valve as claimed in claim 1 for mixing waters which are at various temperatures.

14. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein one of the at least one spring is realized as a recoil spring and one of the at least one spring is realized as a regulator spring, wherein the recoil spring comprises less rigidity than the regulator spring, and wherein the at least one spring are realized in such a manner that a force acting in opposition to the spring forces of the at least one spring initially compresses exclusively the recoil spring and only subsequently or in part simultaneously compresses the regulator spring.

15. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein a monolithic contact piece comprises a guide surface for the one valve body part and/or a stop surface for the other valve body part.

16. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein a monolithic contact piece defines a ring gap at least in regions.

17. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein a monolithic contact piece comprises a guide surface for the one valve body part and/or a stop surface for the other valve body part, and wherein the monolithic contact piece comprises a support surface for a recoil spring, which support surface is located remotely from the other valve body part.

18. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein a monolithic contact piece comprises a guide surface for the one valve body part and/or a stop surface for the other valve body part, wherein the monolithic contact piece comprises a support surface for a recoil spring, which support surface is located remotely from the other valve body part, and wherein the recoil spring is arranged in a ring gap of the monolithic contact piece.

19. A mixing valve comprising a valve housing and a switching valve part and a proportional valve part, wherein either a common valve body or a multi-part valve body is provided for the switching valve part and the proportional valve part, and the valve body comprises a valve body part which faces the switching valve part and a valve body part which faces the proportional valve part, and the valve body is movable by an external force against the resetting force of at least one spring, wherein the valve body part facing the switching valve comprises on its one end at least one cleaning continuation which is realized and/or arranged in such a manner that it can come into contact with a surface of the valve body part facing the proportional valve part, which surface is located opposite the at least one cleaning continuation.

* * * * *